United States Patent [19]
Nicely et al.

[11] Patent Number: 5,125,388
[45] Date of Patent: Jun. 30, 1992

[54] COMPOUND SPEAR SLING

[76] Inventors: Michael J. Nicely, 3801 Aquia Dr.;
Stephen J. Nicely, 2028 Midshipman Dr., both of Stafford, Va. 22554

[21] Appl. No.: 607,046

[22] Filed: Oct. 31, 1990

Related U.S. Application Data

[63] Continuation-in-part of Ser. No. 549,433, Jul. 6, 1990, abandoned.

[51] Int. Cl.$^5$ .................................... F41B 3/02
[52] U.S. Cl. ................. 124/20.1; 124/20.3; 124/22
[58] Field of Search ............ 124/20.1, 20.3, 21, 124/22, 17, 25.6, 25

[56] References Cited

U.S. PATENT DOCUMENTS

| | | | |
|---|---|---|---|
| 2,715,895 | 8/1955 | Loveless | 124/22 X |
| 4,169,453 | 10/1979 | Hunsicker | 124/20.1 |
| 4,169,546 | 10/1979 | Van House | 124/25 X |
| 4,651,707 | 3/1987 | Bozek | 124/17 |
| 4,703,744 | 11/1987 | Taylor et al. | 124/20.1 |
| 4,926,834 | 5/1990 | Chauvin | 124/25 |

FOREIGN PATENT DOCUMENTS 396374  5/1924  Fed. Rep. of Germany ..... 124/20.1

*Primary Examiner*—Peter M. Cuomo

[57] ABSTRACT

A compound spear sling including a frame, a pair of pulleys each with a cam portion and a cable track, an elastomeric material connecting each cam to the frame, and a draw cable.

The draw cable is retracted with the spear to its ready position. As the draw cable is retracted, it rotates the cams which stretch the elastic material in such a way and in such a direction that a mechanical advantage is achieved upon reaching a READY position.

Release of the draw cable reverses rotation of the pulleys due to a snap-action of the elastomeric material.

The pulleys are positioned to enable a spear to pass therebtween subsequent to release of the draw cable.

10 Claims, 5 Drawing Sheets

FIG. 16

COMPOUND SPEAR SLING

This application is a continuation-in-part of application Ser. No. 07/549,433 filed on Jul. 6, 1990, now abandoned.

BACKGROUND OF THE INVENTION

1. Field of the Invention

The present invention relates to a compound spear sling, and more particularly to a compound spear sling having a pair of rotating pulley members each provided with a cam portion and a draw cable track for achieving a mechanical advantage.

2. Description of Related Art

The modern spear sling is a progressive version of its medevil counterpart and is an improvement over known non-triggered underwater spear fishing devices including pole spears, and Hawaiian slings.

Pole spears are spear fishing devices which include long poles which act as a spear. The elastic attached to the pole must be looped over the wrist which grips the pole. The pole is pushed backward after which the pole is gripped at a cocked position. The pole spear is released by loosening a grip on the pole. These pole spears are non-triggering and useful at close range only and are awkward due to excessive pole lengths.

The Hawaiian sling spear fishing device is a cylinder typically made of wood with a hole bored through the center to guide the spear and having elastic attached to the cylinder. The elastic is looped through a spear holder fitting and each end is attached to the cylinder. The elastic is stretched directly back by pulling on the spear holder fitting and is fired by releasing the spear holder fitting. The Hawaiian sling is also non-triggering and power of the spear is directly proportional to power of the rearward draw such that most tension is applied when the spear is in its aiming or ready position and is therefore difficult to hold while aiming.

Disadvantages inherent in the previous types of existing spear fishing devices described above are clear in that the speed of the projectile is dependent upon the strength of the user. Logically, the stronger the user, the more potential energy will be stored in the elastomeric material and the more kinetic energy that will be imparted to the projectile. For those sporting enthusiasts who enjoy the challenge of the hunt without the aid of more modern weapons, the traditional and existing spear fishing devices described above are difficult to use. Unless the sportsman is extremely strong, the projectile will not acquire a speed sufficient for hunting fish.

As in the development of a compound bow, a number of improvements may be made to the spear sling construction which utilize the enhanced force obtained through a simple application of physics. When cable is connected with the use of cams or eccentric pulleys, greater forces are more easily stored within the elastomeric material while reducing draw tension at an aiming position. Thus, with less strength, the user may easily hold a projectile at an aiming position and obtain a projectile velocity of a higher magnitude. As applied to a spear sling, such an improvement has clear advantages. The sportsman is able to enjoy the use of a spear sling without the disadvantages of the more basic designs.

OBJECTS AND SUMMARY OF THE INVENTION

Accordingly, it is a primary object of the present invention to provide a compound spear sling which uses eccentric pulleys and elastic to forcefully throw a projectile yet provide disproportionately light draw tension at an aiming point or a ready position compared to tension of elastic at a similar ready position.

It is a further object of the present invention to enable the use of stronger elastic for throwing a spear with greater force and at a greater range than existing non-triggering spear fishing devices known in the art.

These and other objects of the present invention are fulfilled by providing a compound spear sling comprising:

a primary frame member;

a retractable projectile holder positioned adjacent a first end of said primary frame member;

a pair of pulley members positioned at a first end of said primary frame member, each of said pair of pulley members including a cam portion positioned on an exterior planar surface of said pulley and a cable track formed around a perimeter of said pulley;

means for rotatably supporting said pair of pulley members in a predetermined relationship with respect to each other;

an elastic member having opposing ends thereof attached to a predetermined position of the cam portion for each of said pulley members and an intermediate portion thereof threaded through a second end of said primary frame member;

a cable member having opposing ends thereof attached to a predetermined position of each said pulley members, and an intermediate portion thereof threaded through said retractable projectile holder;

means for rotating each of the pulley members through a predetermined degree of rotation and wrapping the first end of said elastic member about a respective cam portion through the same degree of rotation and in a counter rotative direction, thereby obtaining a mechanical advantage for said pair of pulley members, said means for rotating including unreeling of said cable from said pulley members by retraction of said projectile holder; and means for guiding the projectile between said pair of pulley members, whereby retraction and release of said retractable projectile holder will propel the projectile between said pair of pulley members and away from said compound spear sling at the second end of said primary frame member;

whereby positioning of said pair of pulley members at the first end of said primary frame member enables an unobstructed view of the second end of said primary frame member thereby obtaining a clear field of view for aiming of said projectile.

Further scope of applicability of the present invention will become apparent from the detailed description given hereinafter. However, it should be understood that the detailed description and specific examples, while indicating preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
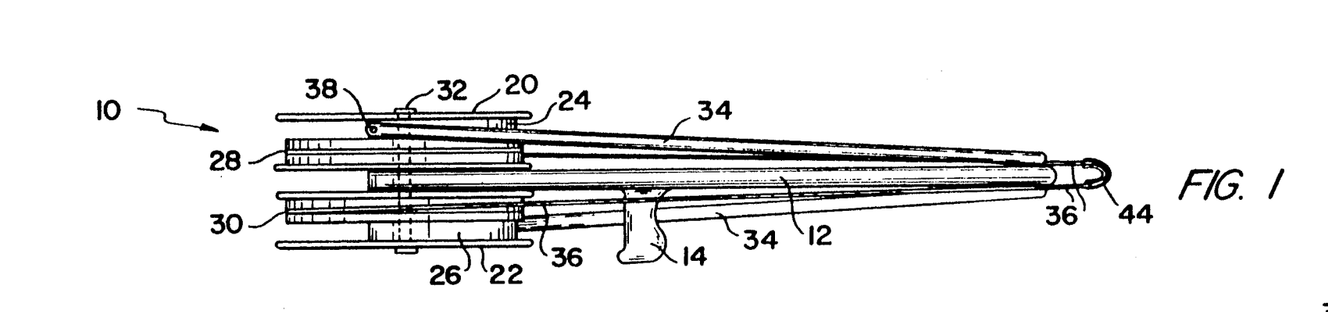
FIG. 1 is a side view of a compound spear sling in accordance with a first embodiment of the present invention.

FIG. 1 is a side view of a compound spear sling in accordance with a first preferred embodiment of the present invention.

Figures 2, 4, 5A, 5B:
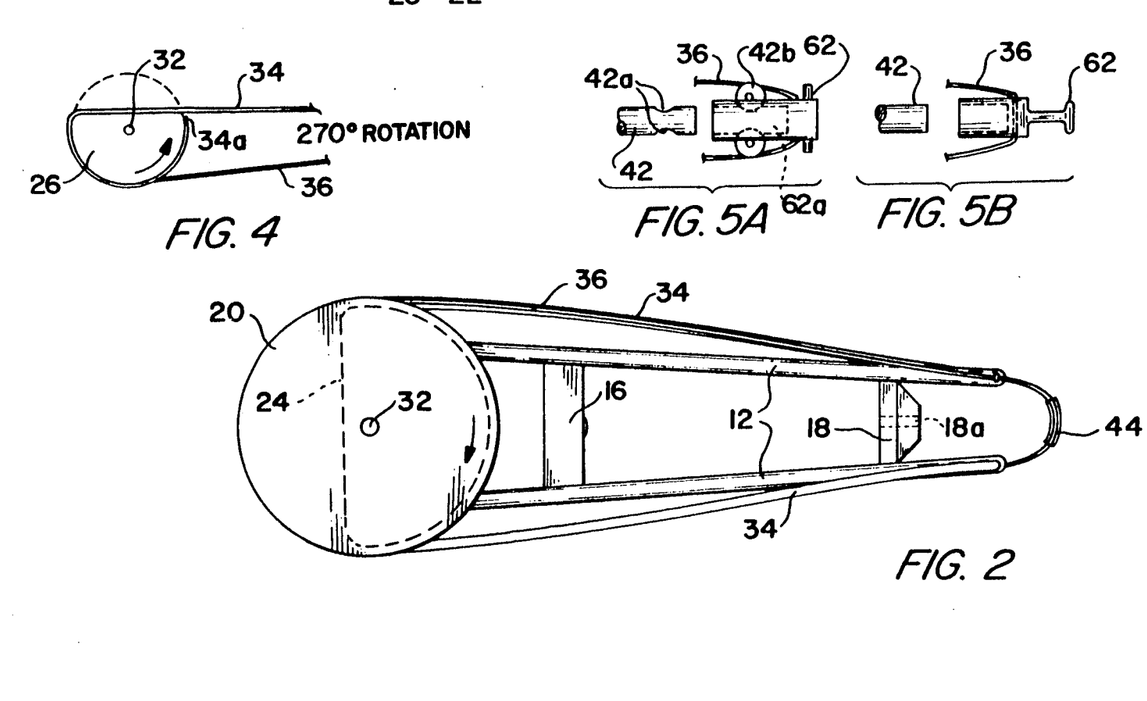
FIG. 2 is a top plan view of the compound spear sling shown in FIG. 1.
FIG. 4 is a top plan view of a single pulley for use in the compound spear sling shown in FIG. 1.
FIG. 5A is a partial side sectional view of a latch-type spear holder for alternative use in the compound spear sling shown in FIG. 6.
FIG. 5B is a partial side sectional view of a grip-type spear holder for alternative use in the compound spear sling shown in FIG. 1.

In FIG. 1 there is generally shown a compound spear sling 10 including a frame 12 formed of a pair of bar members as more clearly shown in the top plan view of FIG. 2. The frame provides structure to the overall compound spear sling and guides a spear 42 (shown only in FIGS. 3 and 8 for purposes of clarification) through an opening in axle 32 which rotatably supports a pair of pulley members 20 and 22. Each of the pulley members 20 and 22 are stacked in a superposed relationship with pulley 22 being positioned below pulley 20 when the compound sling 10 is in an operable position.

Each of the pulleys 20 and 22 include a cam portion 24 and 26 respectively, and cable tracks 28 and 30, respectively. Each of the cable tracks 28 and 30 are of a predetermined depth and dimension to satisfactorily house a draw cable 36 therethrough in a threaded fashion with a first end of the draw cable being anchored to the first pulley member 20 and a second end of the draw cable being anchored to the second pulley member 22 within respective cable guides. The remaining length of the cable is threaded through a spear holder 44 and upon rearward actuation of the spear holder 44 the draw cable 36 is drawn therewith for rotating the pulley members in counter-rotative directions about the axle 32.

Also provided on each of the pulley members 20 and 22 are cam portions 24 and 26, respectively. In the embodiments shown in FIGS. 1 through 3 and 8 through 10, each of the cams are of a semicircular shape with the front flat portion of the semicircle facing forward when the pulleys are in an at rest or non-operational position.

Attached to the first cam member 24 is an elastic member 34 which is anchored to the cam at 38 and also anchored in any suitable manner to the first end of the frame member adjacent the spear holder 44. Likewise, the lower cam member 26 has a similar elastic member anchored thereto on a side opposite that of the first cam member 24 and anchored in a similar manner to the cam and to the first end of the frame member adjacent spear holder 44.

Figure 13:
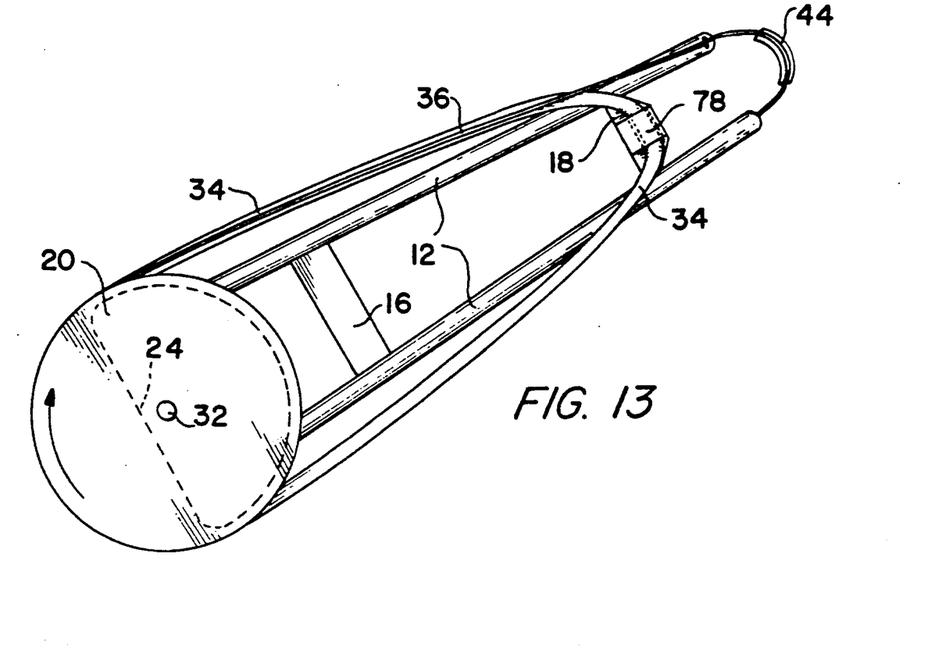
FIG. 13 is a top plan view of an alternative elastic span connection for the embodiment of FIGS. 1 through 3.

Alternatively, and as shown in FIG. 13, the elastic member 34 may be continuous and threaded through an off-center opening 78 formed in spear guide 18 and either above or below opening 18a. Such an arrangement eliminates the need to anchor elastic member 34 at the first end of the frame member. Remaining parts function identical to those disclosed in FIG. 2 and will not be further explained in connection with FIG. 13.

Figure 3:
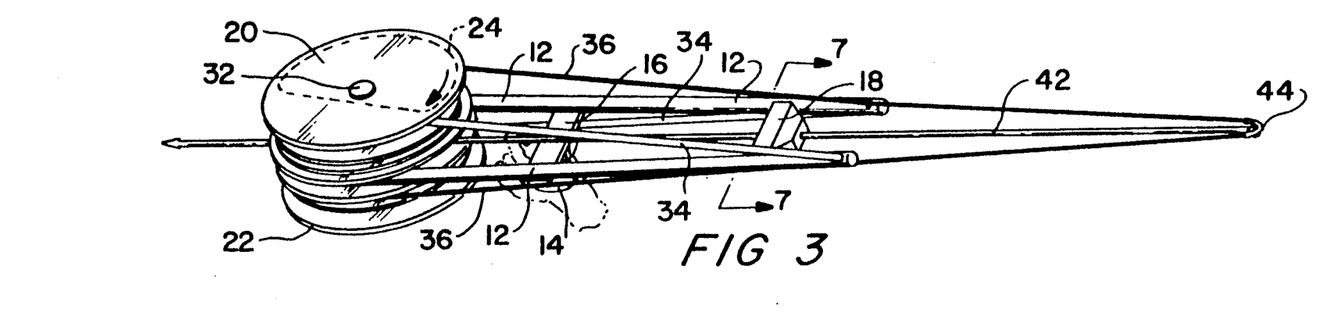
FIG. 3 is a perspective view of the compound spear sling shown in FIG. 1 in a "READY" position.

The purpose of pulleys 20 and 22 is to transfer force from elastic members 34, 34 to the draw cable 36 for throwing a spear with the compound spear sling. As the spear holder 44 is drawn back, thereby also drawing the spear in a rearward direction, the cable 36 is also pulled by the spear holder 44 thereby rotating each pulley around axle 32 in opposite directions and stretching elastic members 34 around respective cam sections thereof. When the spear holder 44 reaches a fully drawn, aiming or "READY" position as shown in FIG. 3, draw tension by the user becomes disproportionately light compared to the energy stored in the elastic, thereby achieving a mechanical advantage. Thus, the feel of the compound spear sling is similar to that of a compound bow in that as the cable is drawn, draw tension increases until the aiming position is nearly reached. At that point, the draw tension lessens as stored energy continues to increase. When the user releases his grip on the spear holder 44, the elastic members 34 (or member 34 as in FIG. 13) constrict and pull each pulley in opposite counter rotating directions thereby drawing the cable 36 back to its original starting position and propelling the spear with significant force away from the compound spear sling. The elastic members 34 in effect provide or produce a snap-action far greater than the release and firing action which can be achieved by a Hawaiian sling or the like, thereby achieving a greater propulsion force in the projectile. Such an arrangement is particularly advantageous in under-water environments where the density of water will tend to increase sluggishness of existing spear-fishing devices.

Further, as can be seen more clearly in FIG. 4, when the spear holder 44 has reached its fully drawn or READY position, the cam member has rotated to a position such that the elastic member 34 is in close proximity to the axle 32. For example, the leading rotating edge of the cam to which the elastic member 34 is attached will rotate up to 270° about the axle 32. Any other appropriate degree of rotation may be incurred, of course by retracting the draw cable 36 to a desired position prior to release thereof. It is in this position of rotation that mechanical advantage is achieved such that the ratio of force produced by the machine is greater than the force required or being applied thereto.

Specifically, FIG. 2 is a top plan view of the compound spear sling shown in FIG. 1 in the rest position showing the front flat edge of cam member 24 facing forward, and FIG. 4 shows lower cam portion 26 at its full rotation with elastic member 34 wrapped completely therearound. Point 34(a) designates the point of attachment of the elastic member to the cam 26.

Thus, the elastic member 34 provides kinetic energy to propel a spear after the spear is drawn and the elastic is fully stretched by the rotation of respective cam members 24 and 26. Two spans of elastic are shown in all but the FIG. 13 embodiment. Each elastic span is anchored to a pulley on opposing sides of the frame for stretching in opposite directions about respective cam members. A strong elastic material such as a cylindrical elastic band which may be manufactured with various diameters similar to surgical tubing but with thicker walls may be used.

The cable 36 for use in the present invention should be of a strong material such as monofilament line or thin stainless steel cable and connects the pulley members 20 and 22 to the spear holder 44 as previously indicated to transfer force from the rotating pulleys at anchored locations to the spear holder 44 which longitudinally propels the spear.

Figure 5C:
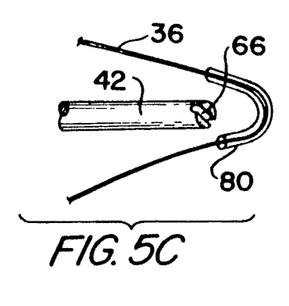
FIG. 5C is an enlarged side perspective view of a slot-type spear holder for use in the compound spear sling shown in FIG. 1.

Although the spear member 42 is not shown in each drawing figure, it should be understood that a similar spear will be used in each of the embodiments described. The spear is a strong cylinder of fluid dynamic dimensions to travel with sufficient momentum for piercing various targets. In the first embodiment, the spear is guided through the frame member 12 via an aperture 18a formed in may rest upon cross member 16 which spaces lateral frame members 12 a predetermined distance apart, and further Passes through an opening formed within the axle portion 32 and exiting from a forward end thereof such as shown in FIG. 3. Further, the spear 42 fits into spear holder 44 such that the spear may be drawn back to an aiming or READY position and is then propelled by release of spear holder 44 attached to the cable 36. FIGS. 5A through 5C show various attachments of the spear 42 to the spear holder 44 as follows.

In FIG. 5A spear 42 may be modified to include indented portions 42a which meet with rotating grip members 42b of spear holder 44 when the spear is fully inserted into the spear holder 44. Elements 62 are grip members formed in connection with a socket type receptacle 62a which enable the user to more easily grip the spear holder 44. Grip members 62 may be of any suitable shape to enable the operator to easily grip the spear holder 44. Thus, when pulling on spear holder 44 as shown in FIG. 5A only portion 62 of the spear holder is gripped while the spear is held within receptacle 62a. For instance, the second and third finger of the hand engage with grip members 62 since the spear is latched into the spear holder. Upon release of the grip members 62, contact of the spear holder 44 with the end of the frame will cause release of the spear for travel of the spear through the remainder of the frame and exiting through the frame at the front end thereof between the pulley members 20 and 22. Thus, the arrangement shown in FIG. 5A releases the spear for its continued travel. FIG. 5B uses a similar gripping member 62 and release of the spear holder 44 by release of the gripping member 62 will cause forward thrust of the spear 42 along with unwinding and constriction of the elastic members 34.

Variations of the spear holder 44 shown in FIGS. 5A and 5B may include the use of a half-moon versus a washer, a ratchet type latch or any other general shape suitable to accommodating an end of a spear 42 therein.

FIG. 5C is an enlarged view of the spear holder 44 shown as a preferred holder throughout the embodiments. In this arrangement, the spear holder 44 includes a short flexible tube 80 surrounding the draw cable 36 at a location which would be gripped by a user. The tube 80 softens the pressure of the draw cable 36 on the user's fingers. Thus, the draw cable 36 in combination with the tube 80 conveniently acts as the spear holder 44 without the need for additional hardware.

Figures 6, 7, 8:
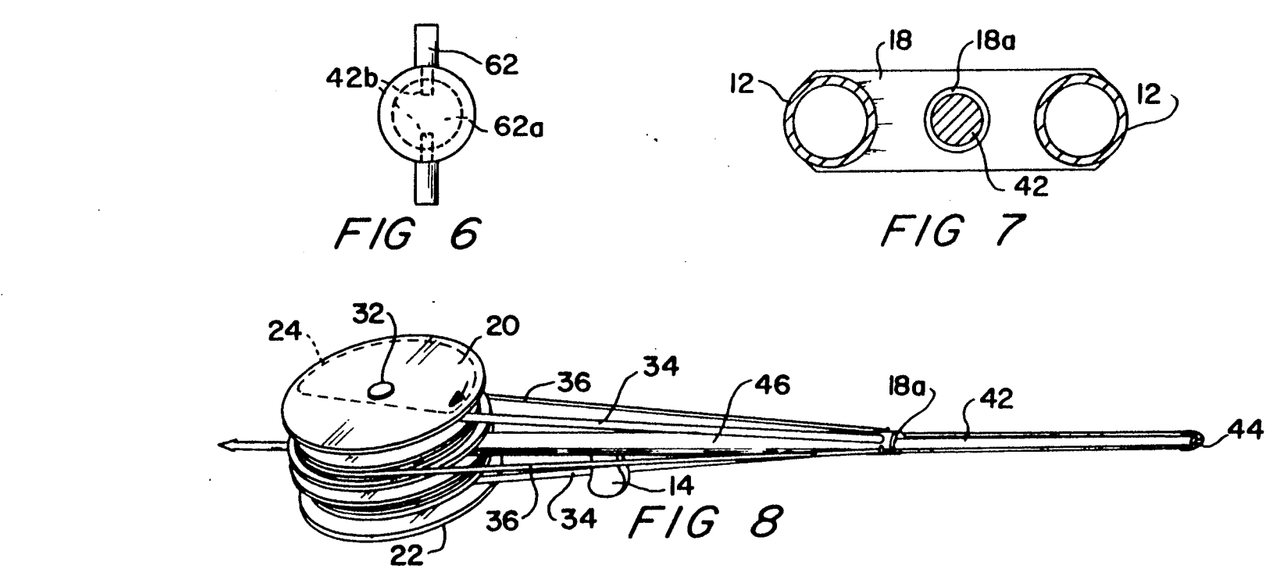
FIG. 6 is an end view of the latch-type spear holder shown in FIG. 5A.
FIG. 7 is cross-sectional view taken along line 7—7 in FIG. 3.
FIG. 8 is a perspective view of a compound spear sling in accordance with a second embodiment of the present invention.

FIG. 6 is an end view of the latch-type spear holder shown in FIG. 5A. Like elements are shown by like reference numerals and will not be further described herein.

FIG. 7 is a cross-sectional view taken along lines 7—7 in FIG. 3 and shows the relationship of bar members 12 to the spear guide portion 18 and aperture 18a formed therein.

Figure 9:
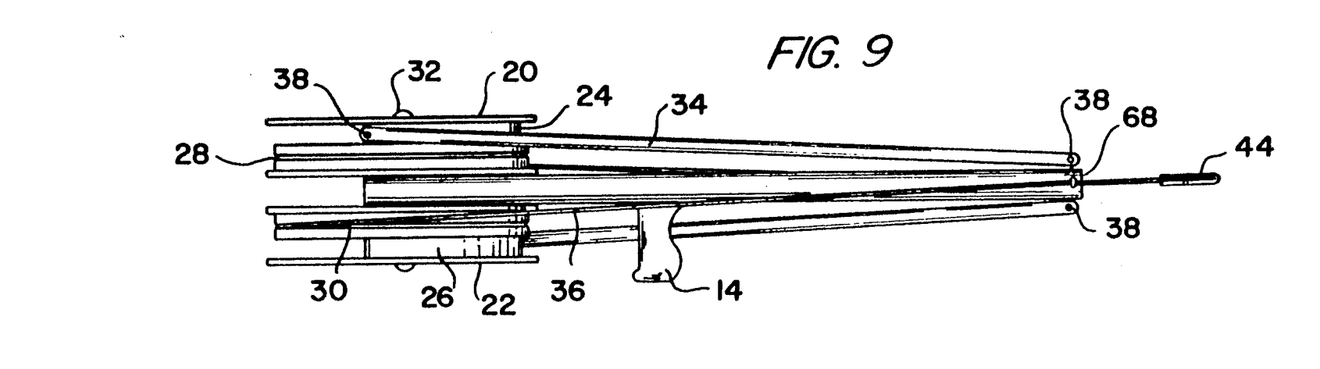
FIG. 9 is a side view of the compound spear sling shown in FIG. 8.
Figure 10:
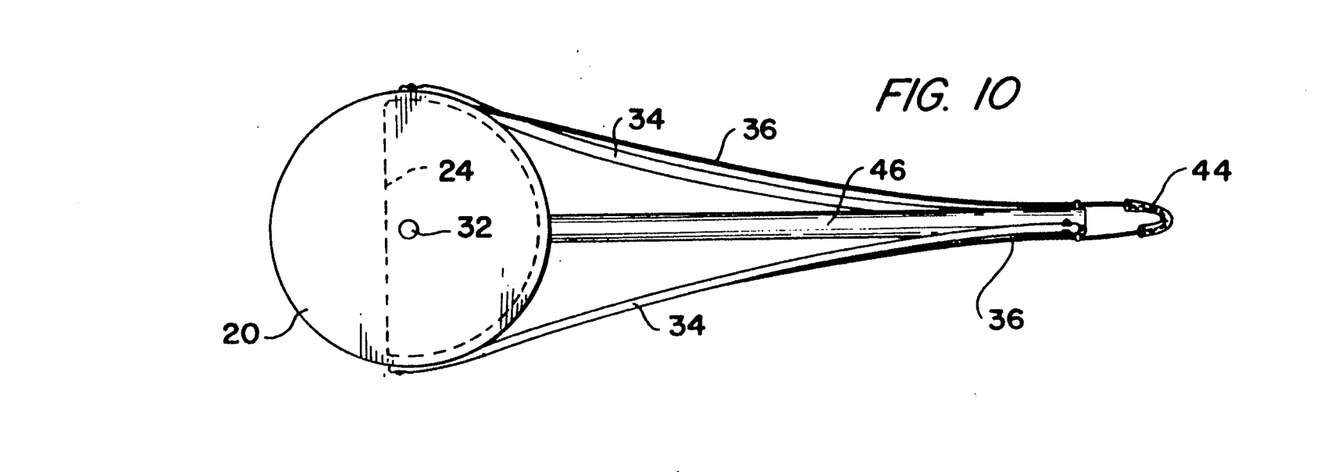
FIG. 10 is a top plan view of the compound spear sling shown in FIG. 8.

FIG. 8 is a perspective view of a compound spear sling in accordance with a second embodiment of the present invention, FIG. 9 is a side view of compound spear sling shown in FIG. 8, and FIG. 10 is a top plan view of the compound spear sling shown in FIG. 8.

The variation shown in FIG. 8 provides for the use of a single frame bar 46 of a hollow construction with an opening or aperture 18a at the first end thereof which functions as a spear guide similar to the embodiment shown in FIGS. 1 through 3 for accommodating a spear 42 therethrough and with a similar spear holder 44 provided therewith. FIG. 8 shows the spear holder 44 at a fully READY position, such that upper cam 24 is shown by hashed lines to be at its full rotation. Similar to the first embodiment described, the compound sling shown in FIGS. 8 through 10 includes upper and lower pulley members 20 and 22 respectively, and axle 32 and cam portions 24 and 26 provided in connection with each of the pulley members 20 and 22, respectively. In addition, a handle 14 may be provided in any of the embodiments shown for steadying the compound spear sling when in use. Functioning of the device is identical to that described in connection with FIGS. 1 through 3 in that launching of the spear is by use of the eccentric pulleys and elastic to forcefully throw the spear, yet provide disproportionately light draw tension at the READY position compared to stretching of elastic without the use of the cam members. It is this point of mechanical advantage that renders the device easy to use and enables the operator to maintain the spear holder 44 at a READY position for extended periods of time since the force required to hold the same at the READY position is minimal due to the mechanical advantage provided by the device.

Figure 11:
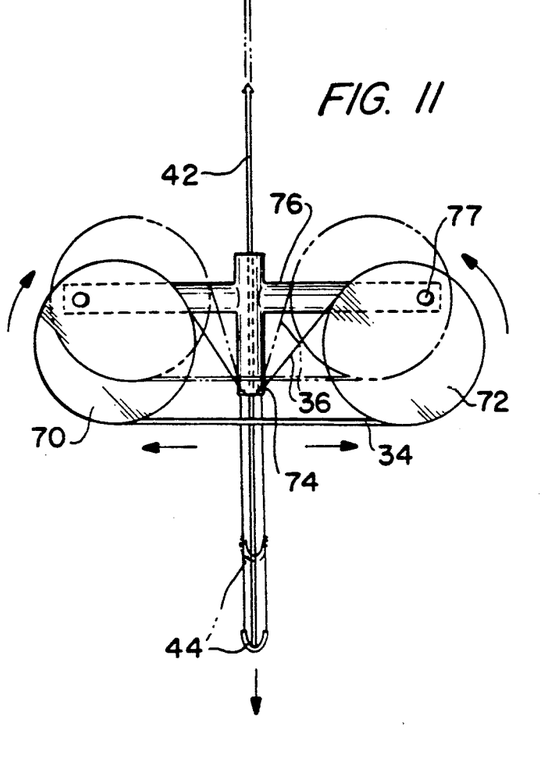
FIG. 11 is a top plan view of a compound spear sling in accordance with a third embodiment of the present invention.
Figure 12:
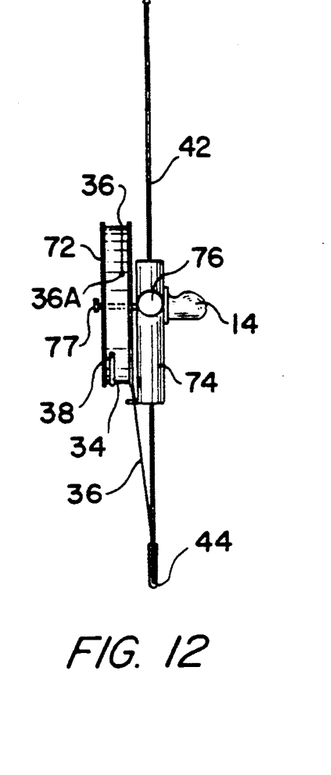
FIG. 12 is a side view of the compound spear sling shown in FIG. 11.

FIG. 11 is a top plan view of a compound spear sling in accordance with a third embodiment of the present invention and FIG. 12 is a side view of the compound spear sling shown in FIG. 11. It will be noted that the variation shown provides for the pair of pulley members to be formed in a planar side-by-side arrangement in a plane coextensive with the frame member having a longitudinal portion 74 and a cross portion 76 provided therewith.

Pulley members 70 and 72 are provided with pivot points 77 about which the pulleys rotate, it being noted that no additional cam portion is provided with this embodiment, the pulleys instead being pivotable or rotatable about off-set pivot points 77 and therefore serving as the cams. The pulleys described in the first and second embodiment could also be used with this embodiment. When in an at rest position, the pulleys are positioned at dot-dash lines in FIG. 11, and when in a READY position are shown by the solid lines in the same figure. A similar mechanical advantage is achieved as described above at the READY position by drawing the spear holder 44 in a rearward direction thereby causing pulley members 70 and 72 to rotate about pivot points 77, the spear holder 44 thus drawing cable 36 therewith and causing elastic members 34 anchored at opposing ends of the pulley members to be stretched in a direction away from the main frame 74 wherein pulley 70 rotates in a clockwise direction and pulley 72 rotates in a counter clockwise direction about pivot points 77 on cross frame 76. When the elastic member is fully stretched and the spear holder 44 is in a fully drawn or READY position, a mechanical advantage is achieved and the operator may maintain the spear holder in a drawn position with relative ease.

A handle 14 is also provided in the embodiment of FIGS. 11 and 12 as particularly shown in FIG. 12. Also shown are the respective anchor points 36a and 38 of the draw cable and the elastic members, respectively.

FIG. 13 is a top plan view of a compound sling similar to the embodiment shown in FIGS. 1 through 3 with the alternative use of a single elastic span looped through an aperture 78 in spear guide 18 where by the aperture is positioned perpendicular to and above or below aperture 18. Similarly, the elastic may be looped around the spear guide 18 if suitably held in place.

All remaining elements of FIG. 13 are shown and operate identical to those elements described in connection with FIGS. 1 through 3.

It should also be understood from the above description that all embodiments may be provided with a single span of elastic 34 as opposed to the use of two spans. These remaining embodiments will thus be modifiable similar to the modification shown in FIG. 13.

Figure 14:
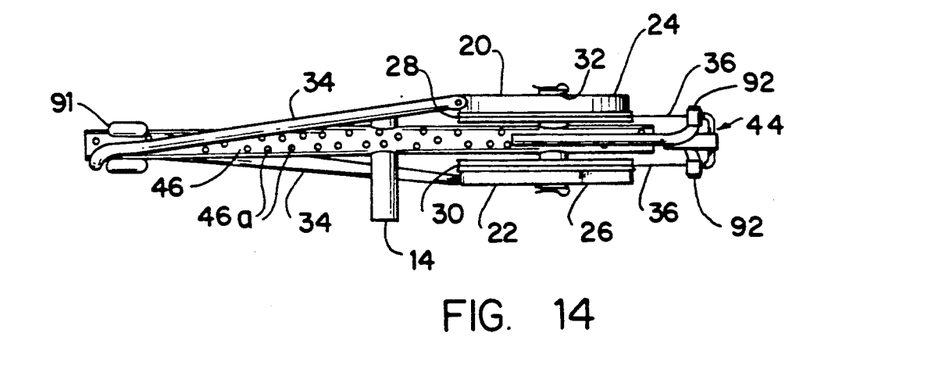
FIG. 14 is a side view of a compound spear sling in accordance with a fourth embodiment of the present invention.
Figure 15:
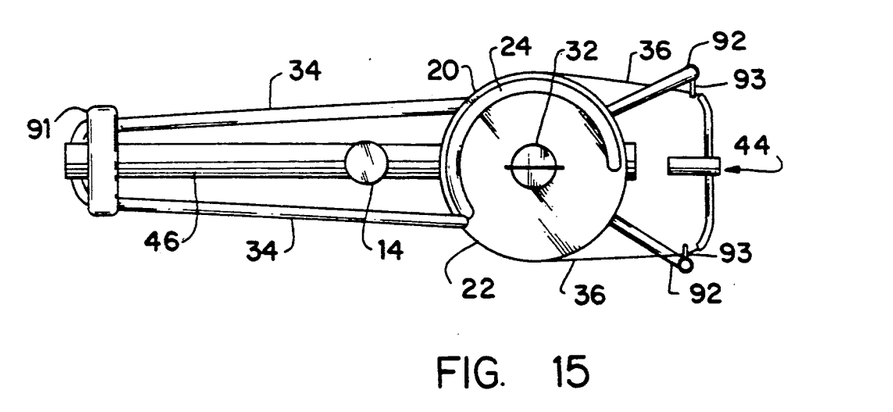
FIG. 15 is a top plan view of the compound spear sling shown in FIG. 14.
Figure 16:
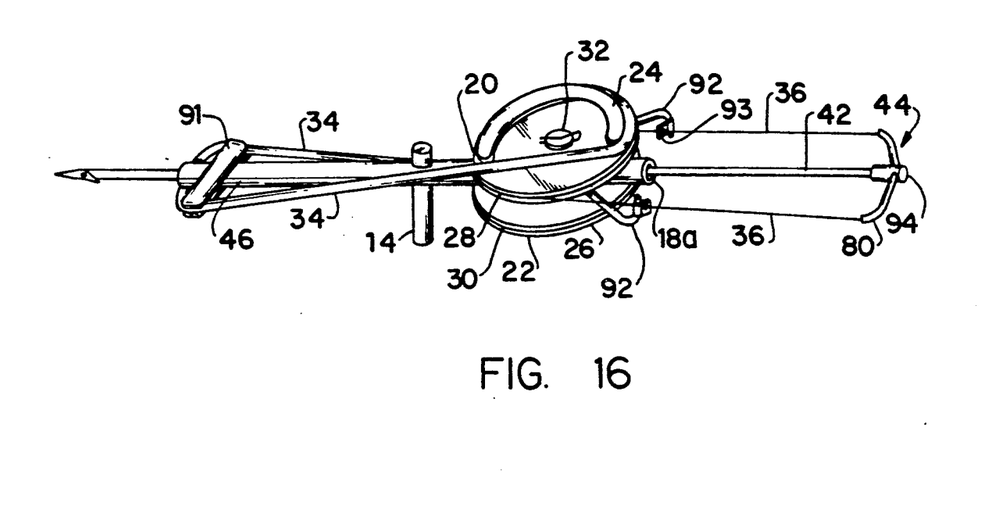
FIG. 16 is a perspective view of the compound spear sling shown in FIG. 14 in a "READY" position.

FIG. 14 is a side view of a compound spear sling in accordance with a fourth embodiment of the present invention, FIG. 15 is a top plan view of the compound spear sling shown in FIG. 14, and FIG. 16 is a perspective view of the compound spear sling shown in FIG. 14.

The fourth embodiment has a single frame member 46 (as in the second embodiment) of a hollow construction with an opening or aperture 18a at the first end thereof which functions as a spear guide as in the second embodiment. The variation shown in FIG. 14 provides for the use of pulleys 20 and 22 mounted on the first end of the unit adjacent to the spear holder 44. The spear holder 44 is drawn in a direction away from the pulleys and on a side of the pulleys opposite from the band 34 which extends from the pulleys 20 and 22 to the second end of the spear holder 46. On each pulley 20 and 22 the cable 36 and elastic 34 extend from the same side of the pulley since they extend in opposite directions. As the spear holder 44 is drawn rearward toward the operator, the cable 36 rotates the pulleys 20 and 22 which stretches the elastic 34 around the perimeter of respective pulleys just as in the first and second embodiments. The elastic 34 is mounted on the upper pulley 20 at first end of cam member 24, extends to a forward end of the frame 46 through a fitting 91, and then extends back to the lower pulley 20 where it is also fastened adjacent cam member 26. The fitting 91 allows the elastic 34 to pass near yet stay clear of the path of the spear 42 and may be formed of short tubes anchored adjacent the distal end of the frame 46 above and below the same or may include flat opposing plates above and below the frame 46. The plates or tubes of 91 extend a predetermined distance overlapping and perpendicular to the frame 46 to enable threading of the elastic 34 therethrough. Mechanical advantage is achieved via the positioning of the cam portions 24 and 26 and subsequent firing action occurs just as described in the first and second embodiments. The handle 14 allows the gripping of the unit in front of the pulleys 20 and 22 and to the rear of fitting 91.

FIG. 15 is a top plan view of the compound spear sling shown in FIG. 14 and FIG. 16 is a perspective view of the compound spear sling shown in FIG. 14 which shows the spear sling in a drawn or "READY" position and also shows the spear 42. A pair of cable guide bars 92 protrude rearward and slightly outward to the side from frame 46. Elastic tabs 93 shown in FIG. 15 and FIG. 16 are attached to distal ends of the pair of cable guide bars 92 and are provided with a grommet type fitting to allow the cable 36 to pass therethrough. The combination of the guide bars 92 and elastic tabs 93 serves the purpose of allowing space for fingers to grip spear holder 44 and as a shock absorber for the cable 36 when the spear 42 is released and the cable 36 is drawn tightly back to the cable guide bars 92 at the termination of the firing action. Various structures that accomplish the described purposes of finger space and shock absorption could be used such as flexible material for the cable guide bars 92, eliminating the elastic tabs 93, and/or using flexible but non-elastic tabs.

The cam portions 24 and 26 of the pulleys shown in FIGS. 14, 15 and 16 are composed of a structure that follows the perimeter of the pulleys approximately one-half of the distance around the perimeter of the pulleys so as to be lightweight and fluid dynamic while spinning.

The spear holder 44 shown in FIGS. 14, 15 and 16 is composed of a short flexible tube 80 as shown in FIG. 5C and a thicker flexible tube 94 shown in FIG. 16. The thinner flexible tube 80 passes through the thicker flexible tube 94. The spear holder 44 is gripped by placing fingers around the thinner flexible tube 80 and alongside the thicker flexible tube 94. The spear 42 which is placed inside the thicker flexible tube 94 is gripped by the user's fingers which are drawn tightly together and compress the thicker tube 94 onto the spear 42 while drawing the spear holder 44 rearward. The described spear holder 44 therefore cushions fingers and grips the spear preventing the spear from slipping out of the tube 94 during the firing action due to the tubes' non-rigid qualities. The spear 42 is thrust by the smaller tube 80 and need not be grooved as in the spear holder described in FIG. 5C. The flexible and inherent gripping nature of tubes 80 and 94 enables use of the wide variety of spears in the disclosed device. In particular, a natural gripping action occurs simply by wrapping a finger around the tube 80 and on each side of tube 94. When drawing the cable 36 and hence grip 44 away from the frame 46, the tube 80 will press inward against the outside of the user's fingers, thereby pressing an inner side of the user's fingers against the tube 94 and thereby securely gripping a spear end within the tube 80. For this reason, any spear end is acceptable within tube 94, including but not limited to grooved, flat, and machined spear ends since the spear end will be gripped by the arrangement described above. The tube 94 could also be made more rigid via a stiff insert made of metal or other rigid material. The insert could have space for spear gripping and an aperture for the smaller tube 80 to have equivalent function as the spear holder 44 described and diagrammed in FIGS. 14, 15 and 16.

The firing action and function are otherwise equivalent to the first and second embodiments in that the spear holder 44 is drawn by the user which draws the cable 36, rotates pulleys 20 and 22, stretches elastic 34, and achieves mechanical advantage by pulley cam positioning at the aiming point.

As shown in FIG. 14, the frame member 46 is preferably formed of a pipe having a plurality of holes 46a formed therein to assist in water displacement upon release of the projectile during operation of the compound spear sling.

Further, it should be understood that although a single elastic member 34 is shown, a pair of elastic bands may also be used as described in connection with previous embodiments.

The embodiment described in connection with FIGS. 14 through 16 may be briefly described as the "rear pulley embodiment". With the rear pulley arrangement described, several advantages occur. Specifically, placement of the pulleys 20, 22 at the rear of the frame 46 "opens up" the front end of the frame to provide a clear field of view when aiming the projectile 42. Since the projectile 42 exits the frame 46 at the forward end thereof, it is beneficial to see the exit point, similar to the view provided when aiming a rifle or the like. In other words, the spear line will be unobstructed.

Further, use of in-line pulleys where the elastic band 34 and cable 36 are not opposed greatly reduces friction, thereby enhancing propulsion of the projectile. Also with this embodiment, the spear or projectile 42 length may be as short as 4 feet since a longer spear length is not necessary to assist in aiming thereof.

Next, the cam arrangement on the exterior surface of each pulley member decreases turbulence and friction with a corresponding increase in firing efficiency.

Finally, in the fourth embodiment, the cable 36 is not exposed other than in a drawn or "READY" position, thereby ensuring longer life of the cable.

In any of the above embodiments, the frame may be formed of a square or cylindrical tube formed of stiff material or other material suitable for supporting the remaining elements. The frame may be one long piece from axle to rear in which case the spear may be guided within the frame or external to the frame.

Regarding the pulleys, the overall pulley size, thickness, or the like may be adjusted according to a size of compound spear sling required, and the cable track may be of varying circumference and different than that of the elastic track thereby causing a type of "gearing". The pulleys in the side-by-side arrangement are merely an alternative to the stacked arrangement, and the positioning of the cable and elastic are adjusted accordingly.

Regarding the elastic members, they may be of varying lengths in one or more spans, and any suitable fastening means may be utilized.

Regarding the draw cable 36, material may be a string line or cable such as a 300 pound test monofilament fishing line, and connection at the spear holder is shown as a single cable passing therethrough so that tension and length readjustment occurs automatically. Alternatively, two separate pieces of draw cable may be attached to the spear holder and fastened at both ends thereof.

All described embodiments may include a spear tethering system in which the spear is tethered to the frame using a thin flexible cable (not shown) to enable easy spear retrieval.

The invention being thus described, it will be obvious that the same may be varied in many ways. Such variations are not to be regarded as a departure from the spirit and scope of the invention, and all such modifications as would be obvious to one of ordinary skill in the art are intended to be included within the scope of the following claims.

I claim:
1. An underwater compound spear sling comprising:
   a primary frame member of an elongated hollow tubular construction having a first end and a second end;
   a retractable projectile holder positioned adjacent the first end of said primary frame member;
   a pair of counter-rotative pulley members positioned at the first end of said primary frame member, said pair of pulley members being vertically stacked in alignment with respect to each other and rotatably supported about central axes thereof such that an upper pulley member is positioned above said primary frame member and a lower pulley member is positioned below said primary frame member, each pulley of said pair of pulley members including a cam portion integrally formed therewith, the cam portion being a raised semicircular member having leading and trailing edges, an upper cam being positioned on an outer planar surface perimeter of the upper pulley member and a lower cam being positioned on an outer planar surface perimeter of the lower pulley member each of the upper and lower cams being positioned in a mutually opposing relationship, and wherein each of said upper and lower pulley members include a cable track formed around a perimeter thereof, said primary frame member guiding a projectile between said pair of pulley members;
   an elastic member having a first end attached to a trailing edge of an upper pulley of said pair of pulley members, a second end attached to a trailing edge of a lower pulley of said pair of pulley members, and an intermediate portion thereof threaded through a second end of said primary frame member;
   a cable member housed within the cable track of said pulley members, wherein a first end of the cable is attached to the cable track of the upper pulley member at a point intermediate the leading and trailing edges of said upper cam, the cable being wrapped counter-clockwise around the upper pulley member in said cable track, an intermediate portion of the cable being threaded through said retractable projectile holder and actuable thereby, and a second end of the cable attached to the cable track of the lower pulley member at a point intermediate the leading and trailing edges of said lower cam, the cable being wrapped clockwise around the lower pulley in said cable track; and a handle member positioned forward of said pair of pulley members on said primary frame member;

wherein retraction of said projectile holder counter-rotates said pulleys with respect to each other through a rotation from about 270° to about 360° and wraps the elastic member from the trailing edge to at least the leading edge of the upper and lower cams through the rotation, thereby obtaining a mechanical advantage for said pair of pulley members, and wherein subsequent release of said projectile holder forcibly propels the projectile from said primary frame member at the second end thereof due to contraction of said elastic member with the leading end of each of the upper and lower cams rotating in advance of the trailing edges of each of the upper and lower cams.

2. The underwater compound spear sling according to claim 1, further including shock absorption means, attached to distal ends of cable guide bars, for absorbing the cable when the projectile is released.

3. The underwater compound spear sling according to claim 1, further including cable guide means, positioned adjacent the first end of said primary frame member, for spacing said projectile holder away from said pair of pulley members and absorbing the force of a released cable subsequent to launching the projectile.

4. The underwater compound spear sling according to claim 1, wherein each of said cam portions are formed around about one-half the distance of the planar perimeter of each pulley of said pair of pulley members.

5. The underwater compound spear sling according to claim 1, wherein the degree of rotation is 315°.

6. The underwater compound spear sling according to claim 1, wherein the degree of rotation is 360°.

7. The underwater compound spear sling according to claim 1, wherein said retractable projectile holder is a flexible tube member surrounding the draw cable.

8. The underwater compound spear sling according to claim 1, wherein said pair of pulley members are rotatably supported in a superposed relationship by a central shaft perpendicularly mounted to said primary frame member.

9. The underwater compound sling according to claim 1, wherein the degree of rotation is 270°.

10. The underwater compound spear sling according to claim 1, wherein said retractable projectile holder includes a first flexible tube member surrounding the draw cable at a position for receiving a spear end and a second flexible tube holder integrally formed with and positioned perpendicular to said first flexible tube member, whereby gripping of said first flexible tube member on both sides of said second flexible tube member enables secure retention of the spear end prior to release thereof.

* * * * *